United States Patent

Romas

Patent Number: 5,993,017
Date of Patent: Nov. 30, 1999

[54] EXTERIOR REARVIEW MIRROR

[75] Inventor: Vasile Romas, Esslingen, Germany

[73] Assignee: Reitter & Schefenacker GmbH & Co. KG

[21] Appl. No.: 09/262,971

[22] Filed: Mar. 4, 1999

[30] Foreign Application Priority Data

Mar. 7, 1998 [DE] Germany ............... 198 09 902

[51] Int. Cl.⁶ .................................. G02B 7/182
[52] U.S. Cl. ................. 359/871; 359/872; 359/873; 248/475.1; 248/477
[58] Field of Search ...................... 359/871, 872, 359/841, 873, 874; 248/475.1, 477, 478, 483, 491, 496

[56] References Cited

U.S. PATENT DOCUMENTS

| | | |
|---|---|---|
| 4,951,912 | 8/1990 | Manzoni .................. 248/475.1 |
| 5,061,056 | 10/1991 | You ............................ 359/872 |
| 5,327,294 | 7/1994 | Koske et al. ............... 359/872 |
| 5,600,497 | 2/1997 | Leonberger ................ 359/875 |

FOREIGN PATENT DOCUMENTS 41 30 176 A1 3/1993 Germany.

*Primary Examiner*—Cassandra Spyrou
*Assistant Examiner*—Mohammad Y. Sikder
*Attorney, Agent, or Firm*—Robert W. Becker & Associates

[57] ABSTRACT

An exterior rearview mirror has a mirror head carrier and a mirror connected to the mirror head carrier. A cover is slipped onto the mirror head carrier. A spring secures the cover to the mirror head carrier in an unstressed position of the spring. The spring has at least one locking member and the cover has a counter locking member, wherein the at least one locking member engages the counter locking member to secure the cover at the mirror head carrier. The spring has a securing latch securing the spring in an elastically compressed position, wherein the spring in the elastically compressed position releases the cover.

17 Claims, 4 Drawing Sheets

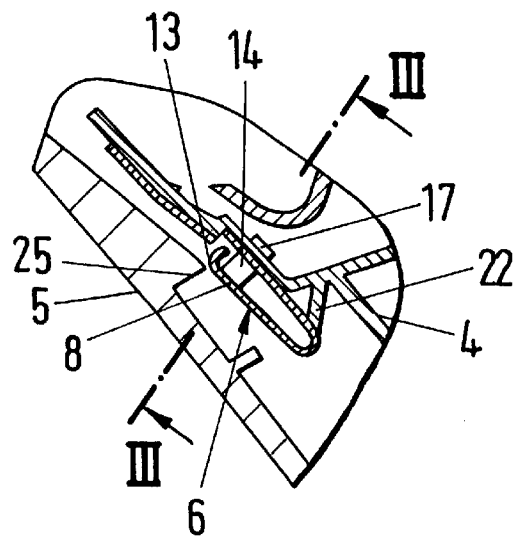
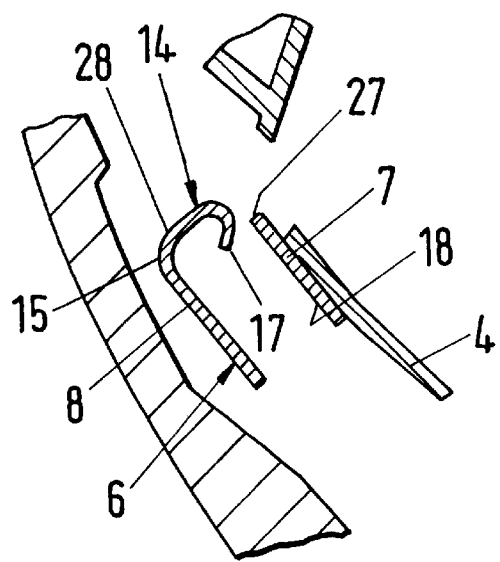
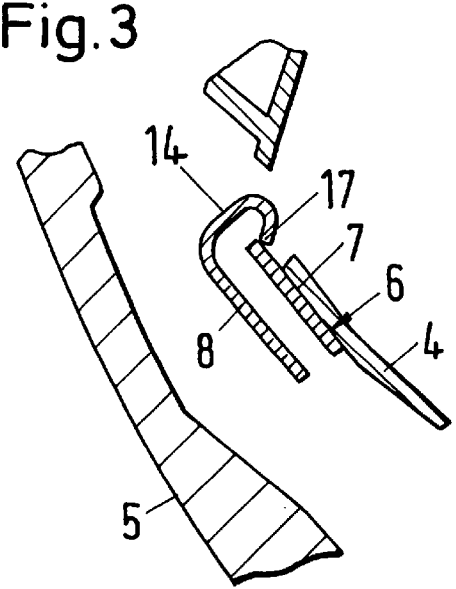

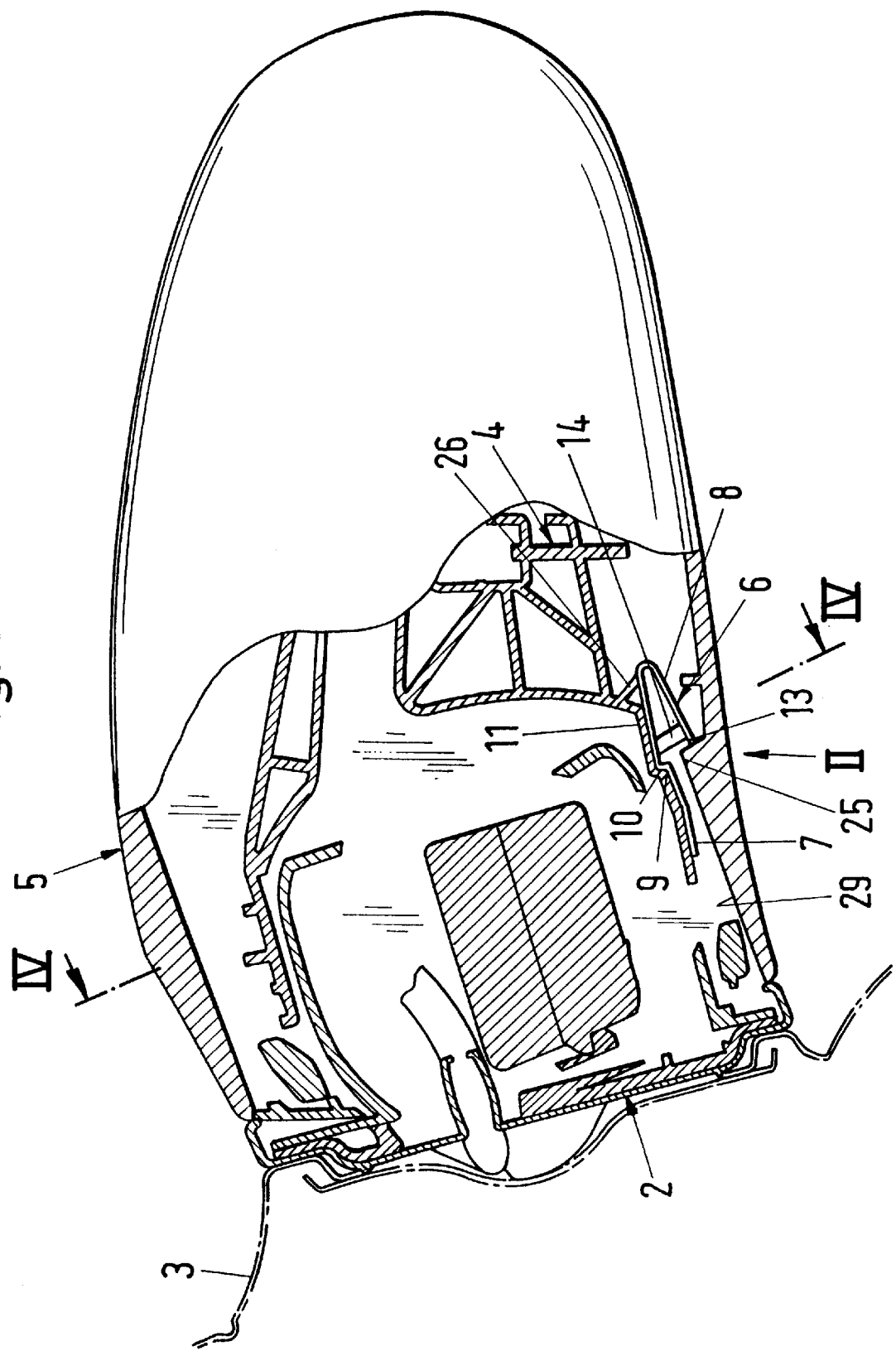

5,993,017

EXTERIOR REARVIEW MIRROR

BACKGROUND OF THE INVENTION

The present invention relates to an exterior rearview mirror especially for motor vehicles, comprising a mirror head which has a mirror head carrier onto which a cover can be slipped which is secured with at least one spring at the mirror head carrier whereby the spring has at least one locking member that cooperates with a counter locking member at the cover.

In known exterior rearview mirrors of this kind (German Patent Application 41 30 176) the cover is secured by a spring in the mounted position against accidental release. For releasing the cover, the spring must be compressed by pushing a screwdriver from the exterior through an opening of the cover. The spring must be held in this compressed position until the cover has been slipped past the spring in the outward direction. Only then the tool (screwdriver) can be removed and the spring returns into its unstressed position. This release process is difficult and requires a certain amount of dexterity and time.

It is therefore an object of the present invention to embody an exterior rearview mirror of this kind such that the cover can be mounted in a simple and fast fashion at the mirror head carrier and can be removed also simply and without having to hold the spring in the compressed position.

SUMMARY OF THE INVENTION

According to the present invention, the exterior rearview mirror has a mirror head carrier and a mirror head connected to the mirror head carrier. The cover is slipped onto the mirror head carrier. A spring secures the cover to the mirror head carrier in an unstressed position of the spring. The spring has at least one locking member and the cover has a counter locking member. The at least one locking member engages the counter locking member to secure the cover at the mirror head carrier. The spring has a securing latch securing the spring in an elastically compressed position wherein the spring in the elastically compressed position releases the cover.

Due to the inventive embodiment, the spring for releasing the cover can be locked by the securing latch in the compressed position so that it no longer has to be held in the compressed state by a tool. In the compressed and locked position of the spring the locking member is outside of the release path of the cover, i.e., disengaged from the counter locking member of the mirror head carrier. Accordingly, the cover can be easily removed from the mirror head carrier.

BRIEF DESCRIPTION OF THE DRAWINGS

The object and advantages of the present invention will appear more clearly from the following specification in conjunction with the accompanying drawings, in which:

FIG. 2 shows an enlarged representation of the detail II of FIG. 2 whereby the locking action between the mirror head carrier and the cover is released;

FIG. 3 shows in an enlarged representation a section along the line III—III of FIG. 2;

FIG. 4 shows a representation according to FIG. 3 whereby, however, the spring is in the locked position at the cover, as shown in FIG. 1;

FIG. 6 shows the inventive exterior rearview mirror according to FIG. 1 partly in a longitudinal section and partly in an end view.

DESCRIPTION OF PREFERRED EMBODIMENTS

Figure 1:
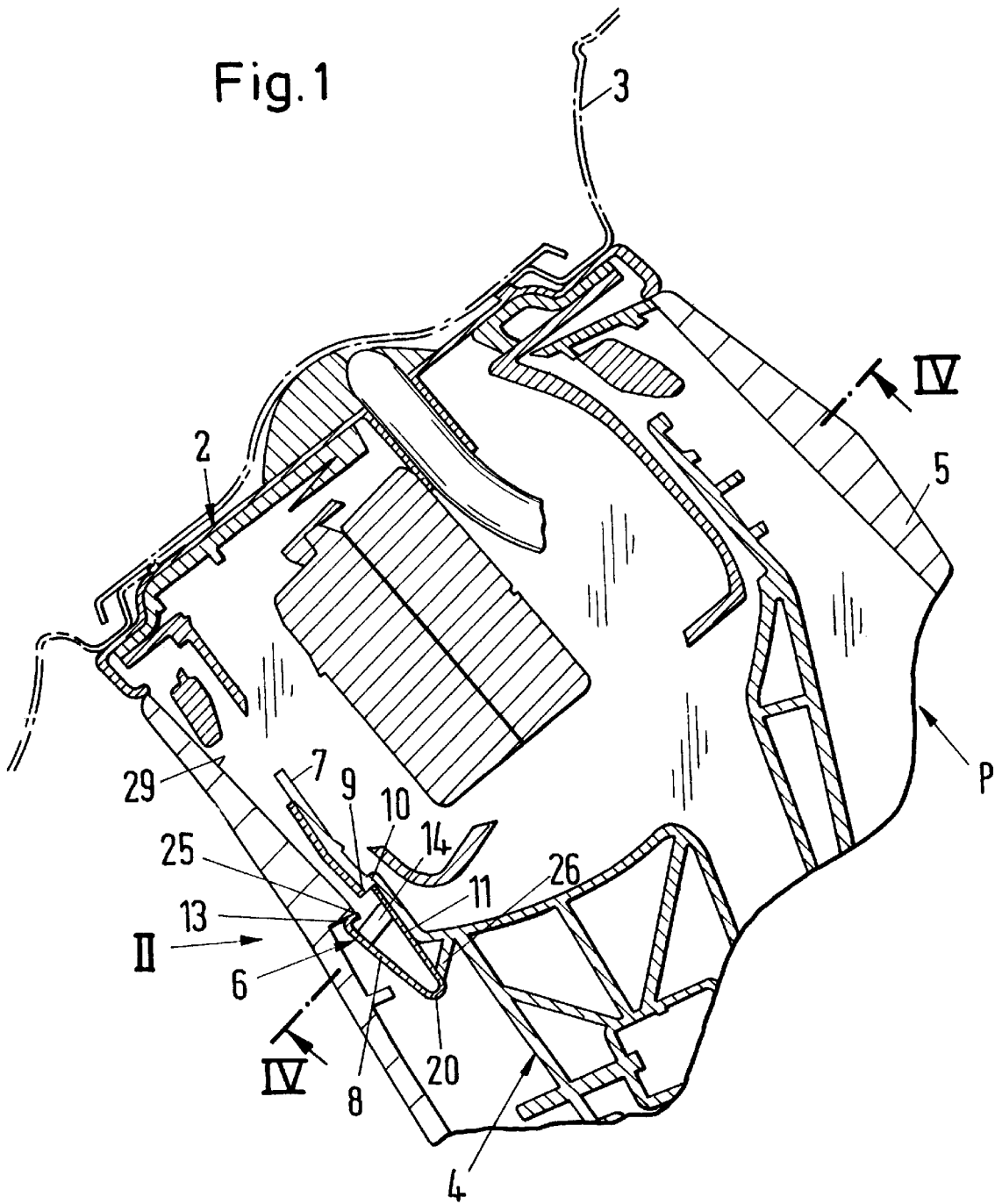
FIG. 1 shows in longitudinal section a portion of the inventive exterior rearview mirror, which is fastened to the car body sheet metal of a motor vehicle and has a cover which is secured by a spring in its locking position at the mirror head carrier.

The exterior rearview mirror 1 shown in FIGS. 1 and 6 corresponds substantially to the basic design of conventional exterior rearview mirrors as they are used in connection with motor vehicles, especially passenger cars. It has, in a manner known to a person skilled in the art, a mirror support 2 which is fastened to the car body sheet metal 3 of a non-represented vehicle. The mirror support 2 is connected to a mirror head carrier 4 onto which a cover 5 is slipped in the direction of arrow P. At the mirror head carrier 4 the non-represented mirror pane support is supported in a manner known to a person skilled in the art which can be manually or automatically adjusted. The cover 5 is comprised of plastic material while the mirror head carrier is produced by pressure casting or of fiber glass-reinforced plastic material. A spring 6 is connected to the mirror head carrier 4 with which the cover 5 is secured by a snap connection in the mounted position at the mirror head carrier 4.

Figure 5:
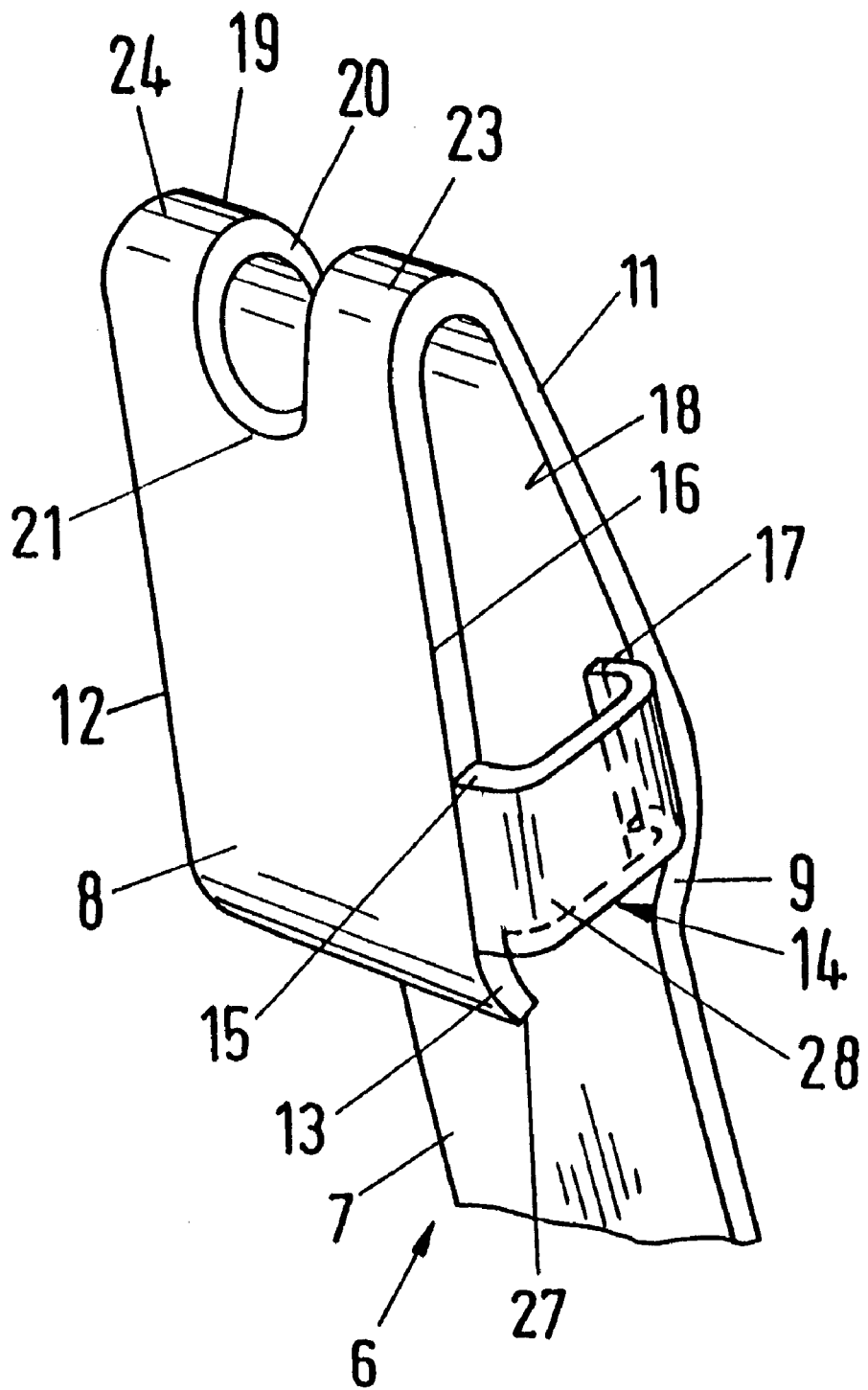
FIG. 5 shows a portion of the spring according to FIGS. 1 through 4 in an enlarged and perspective representation.

As can be seen especially in FIG. 5, the spring 6 is comprised of flat sheet material. It has a longer leg 7 and a shorter leg 8 which are connected to one another by a connecting member 19. The shorter leg 8 has a length that is only substantially half the length of the other leg 7. The leg 7 has approximately at half its length a step 9 with which it is positive-lockingly secured by the mounted spring 6 at the mirror head carrier 4 (FIG. 2). The shorter leg 8 forms with the leg portion 11 of the leg 7 a V-shaped spring part 12 with which the cover 5 can be snap-secured at the mirror head carrier 4. The free end 13 of the leg 8 is curved inwardly substantially as a partcircular member into the direction toward the leg 7 (FIGS. 2 and 5). Below the end 13 a U-shaped securing latch 14 is positioned transversely to the leg 8. The securing latch 14 is, as can be seen especially in FIGS. 3 and 4, a unitary part of the leg 8. With one of its legs 15, securing the latch 14 is connected to and projects perpendicularly from the longitudinal side 16 of the leg 8. When the spring part 12 is not compressed (unstressed), the free leg 17 of the securing latch 14 is positioned at a distance from the inner side 18 of the leg 7 (FIG. 4).

In the release position of the spring 6 (in its non-compressed or unstressed state) the end 13 of the leg engages a catch 25 of the cover 5 (FIG. 1, FIG. 6) so that in its mounted position it is secured against accidental release counter to the cover slip-on direction P. For releasing the cover 5 from the mirror head carrier 4, the spring leg 8 is pressed elastically against the spring leg 7 which in the mounted position of the spring 6 rests areally at the mirror head carrier 4. The free leg 17 of the securing latch 14 is advantageously curved such that the securing latch 14 upon locking of the spring leg 8 will come to rest at the free edge 27 (FIG. 4) of the spring leg 7. This results in the transverse stay 28 of the securing latch 14 extending substantially perpendicularly to the spring legs 7, 8 being elastically bent backward until the free leg 17 of the securing latch 14 engages behind the spring leg 7 (FIGS. 1, 3 and 6). The transverse stay 28 of the securing latch 14 is elastically returned in this position so that the spring 6 is now in a secured position. In this snapped-in position the spring leg 8 is bent backwardly to such an extent that the free end 13 of the spring leg 8 is outside of the travel path of the cover 5, i.e., can no longer contact the catch 25. Accordingly, the cover 5.can now be removed counter to the slip-on direction P from the mirror head carrier 4.

The connecting member 19 between the legs 7 and 8 of the spring 6 is curved in a part-circular shape and has a penetration 20 (FIG. 5) which is positioned symmetrical to the longitudinal center plane of the spring 6. As can be seen especially in FIG. 1, a stay 26 of the mirror head carrier 4 extends into the projection 20 so that the spring 6 is securely held in the mounted position. The penetration 20 has in a developed view of the spring 6 an elongate rectangular contour with rounded narrow edges. The width of the penetration 20 corresponds to substantially the width of the lateral portions 23 and 24 of the connecting member 19 positioned on either side of the penetration 20.

The spring 6 secures the cover 5 in the mounted position in a simple manner. The cover 5 can be removed simply and quickly for repair purposes. For this purpose, the spring 6 must only be compressed by a tool such as a screwdriver etc. in the aforementioned manner. The cover 5 is provided with an opening for extending the tool into the interior. Since the spring 6 is secured in the compressed state, by the securing latch 14 the cover 5 can be removed without problems from the mirror head carrier 4. Since the spring 6 must not be manually held in the compressed position, the release can be carried out without difficulty.

When the spring 6 is not secured, the spring legs 7, 8 extend in the shape of a V to one another (FIGS. 1, 6). In the sliding direction P the spring legs 7, 8 diverge. Upon slipping the cover 5 onto the mirror head carrier 4, a slanted surface 29 (FIGS. 1, 6) connected to the catch 25 will slip onto the spring leg 8. Since the slanted surface 29 has an upward slant orientation in the inward direction and counter to the direction P, the spring leg 8 is elastically bent backwards until its free end 13 engages behind the catch 25. The securing latch 14 is embodied such that upon bending backward of the spring leg 8 it will not reach its securing position. The spacing of the free leg 17 of the securing latch 14 from the spring leg 7 is greater than the bending travel of the spring leg 8 upon sliding on the cover 5. Accordingly, the cover 5 after slipping it on the mirror head carrier 4, is automatically locked.

The specification incorporates by reference the disclosure of German priority document 198 09 902.9 of Mar. 7, 1998.

The present invention is, of course, in no way restricted to the specific disclosure of the specification and drawings, but also encompasses any modifications within the scope of the appended claims.

What is claimed is:

1. An exterior rearview mirror for motor vehicles, said mirror comprising:

a mirror head carrier (4) and a mirror head connected to said mirror head carrier (4);

a cover (5) slipped onto said mirror head carrier (4);

a spring (6) securing said cover (5) to said mirror head carrier (4) in an unstressed position of said spring (6), wherein said spring (6) has at least one locking member (13) and said cover (5) has a counter locking member (25), wherein said at least one locking member (13) engages said counter locking member (25) to secure said cover (5) at said mirror head carrier (4);

said spring (6) having a securing latch (14) securing said spring (6) in an elastically compressed position, wherein said spring (6) in said elastically compressed position releases said cover (5).

2. A mirror according to claim 1, wherein said spring (6) has a first spring leg (8) and a second spring leg (7), wherein said securing latch (14) is connected to said first spring leg (8).

3. A mirror according to claim 2, wherein said securing latch (14) is positioned transversely to said first spring leg (8).

4. A mirror according to claim 2, wherein said spring (6) consists of flat sheet material.

5. A mirror according to claim 2, wherein said at least one locking member (13) is a free end of said first spring leg (8).

6. A mirror according to claim 2, wherein said securing latch (14) has a U-shaped cross-section having a first leg and a second leg.

7. A mirror according to claim 2, wherein said first leg (15) of said securing latch (14) is connected to one of the longitudinal sides of said first spring leg (8) of said spring (6) and projects perpendicularly from said longitudinal side.

8. A mirror according to claim 2, wherein said second leg (17) of said securing latch (14) forms a hook engaging said second spring leg (7) of said spring (6) in said elastically compressed position.

9. A mirror according to claim 2, wherein said second spring leg (7) of said spring (6) is substantially twice as long as said first spring leg (8) of said spring (6).

10. A mirror according to claim 2, wherein said first spring leg (7) of said spring (6) has a free edge that is curved in a direction onto said second spring leg (8) to form said locking member (13).

11. A mirror according to claim 2, wherein said second spring leg (7) of said spring (6) has a step (9) and wherein said locking member (13) of said first spring leg (8) is positioned opposite said step (9).

12. A mirror according to claim 11, wherein said mirror head carrier (4) has a recess (10) and wherein said step (9) of said spring (6) rests at said recess (10) when mounted.

13. A mirror according to claim 2, wherein said spring (6) has a connecting member (19) connecting said first spring leg (8) and said second spring leg (7) of said spring (6), wherein said connecting member (19) has a penetration (20).

14. A mirror according to claim 13, wherein said penetration (20) is arranged symmetrically to a longitudinal center plane of said spring (6).

15. A mirror according to claim 13, wherein said penetration (20) has a width identical to a width of lateral portions (23, 24) of said connecting member (19) positioned on opposed sides of said connecting member (19).

16. A mirror according to claim 13, wherein said mirror head carrier (4) has a stay (26) and wherein said stay (26) engages said penetration (20).

17. A mirror according to claim 13, wherein said second leg (17) of said securing latch (14) forms a hook engaging said second spring leg (7) of said spring (6) in said elastically compressed position and wherein said hook engages said second spring leg (7) of said spring (6) at a location between said step (9) and said connecting member (19).

* * * * *